US012565797B2

(12) United States Patent
Maisey

(10) Patent No.: US 12,565,797 B2
(45) Date of Patent: Mar. 3, 2026

(54) LOCKING MECHANISM

(71) Applicant: MAISEY FENCE, LLC, Anchorage, AK (US)

(72) Inventor: Kyler Maisey, Anchorage, AK (US)

(73) Assignee: MAISEY FENCE, LLC, Anchorage, AK (US)

(*) Notice: Subject to any disclaimer, the term of this patent is extended or adjusted under 35 U.S.C. 154(b) by 213 days.

(21) Appl. No.: 18/352,049

(22) Filed: Jul. 13, 2023

(65) Prior Publication Data

US 2024/0018810 A1 Jan. 18, 2024

Related U.S. Application Data

(60) Provisional application No. 63/368,307, filed on Jul. 13, 2022.

(51) Int. Cl.

| | |
|---|---|
| ***E05C 3/04*** | (2006.01) |
| ***E05B 65/00*** | (2006.01) |
| ***E05C 3/00*** | (2006.01) |

(52) U.S. Cl.

CPC .......... *E05C 3/042* (2013.01); *E05B 65/0007* (2013.01); *E05C 3/004* (2013.01)

(58) Field of Classification Search

CPC .... E05B 15/02; E05B 15/0205; E05B 15/023; E05B 65/0067; E05B 65/48; E05B 65/38; E05B 65/383; E05B 65/0007; E05C 3/04; E05C 3/041; E05C 3/042; E05C 3/004; E05C 3/06; E05C 3/10

See application file for complete search history.

(56) References Cited

U.S. PATENT DOCUMENTS

| | | | | |
|---|---|---|---|---|
| 565,847 A * | 8/1896 | Edwards | E05C 19/105 | 292/DIG. 44 |
| 633,552 A * | 9/1899 | Kenny | E05B 65/0841 | 292/241 |
| 677,432 A * | 7/1901 | Biehl | E05B 65/0007 | 292/210 |
| 776,089 A * | 11/1904 | Roy | E05B 65/0811 | 70/97 |
| 2,194,408 A * | 3/1940 | Sluss | E05B 65/0007 | 292/136 |

(Continued)

FOREIGN PATENT DOCUMENTS

| | | | |
|---|---|---|---|
| DE | 202013103511 U1 * | 11/2013 | E05B 83/44 |
| GB | 2245641 A * | 1/1992 | E05C 3/042 |

(Continued)

*Primary Examiner* — Christine M Mills
*Assistant Examiner* — Faria F Ahmad
(74) *Attorney, Agent, or Firm* — Summit Patents PC

(57) ABSTRACT

Locking mechanisms are designed to retain gates or other passageways in a locked and an unlocked position as a way to pass through a gate in a barrier or boundary, such as a fence, that encloses a space. A rotatable locking arm is attached to the gate while its neighboring fence section has a catch secured to it. When the locking arm is radially rotated to a secured, locked position, it is retained in an enclosed channel of the catch. Any ground heave or movement that shifts the gate with the locking arm relative to the neighboring fence section with the catch will allow the locking arm to move within the enclosed channel while retaining the locking arm in a locked position, which keeps the gate closed and the enclosed space secured.

18 Claims, 9 Drawing Sheets

(56) References Cited

U.S. PATENT DOCUMENTS 2,246,344 A * 6/1941 Calderwood ........... E05C 3/042 292/341.15
2,274,259 A * 2/1942 Russo ..................... E05B 57/00 70/135
2,635,908 A * 4/1953 Zuber ..................... E05C 3/042 70/139
2,644,708 A * 7/1953 Bertram .................. E05C 3/167 292/210
3,012,430 A * 12/1961 Spork ................... E05B 65/087 70/99
3,767,245 A * 10/1973 Keefe ................. E05B 15/0205 292/340
3,829,139 A * 8/1974 Storlie .................... E05C 3/042 70/135
3,876,237 A * 4/1975 Hayes, Jr. ............... E05C 3/042 292/DIG. 60
4,062,575 A * 12/1977 Robins .................... E05C 3/167 292/67
4,126,343 A * 11/1978 Ragland .............. E05B 15/0205 292/341
RE31,276 E * 6/1983 Schlage .............. E05B 15/0205 292/340
4,581,907 A * 4/1986 Eberly .................... E05B 67/38 292/281
5,452,927 A * 9/1995 Uyeda ....................... E05C 3/10 292/202
5,529,352 A * 6/1996 Chin ....................... E05C 3/041 292/230
5,772,265 A * 6/1998 Gilbert ...................... E05C 3/04 292/210
6,679,530 B2 * 1/2004 Krynski .............. E05B 65/0007 292/210
10,006,231 B2 * 6/2018 Grommet .................. E05C 3/08
10,724,277 B2 * 7/2020 Baker .................... E05B 63/044
11,131,116 B2 * 9/2021 Ward .................... E05B 15/025
11,473,349 B2 * 10/2022 Wahba ...................... G08B 3/10
11,505,966 B2 * 11/2022 Crosser ............... E05B 65/5253
12,006,746 B2 * 6/2024 Lajewardi ............... E05B 63/04
12,104,402 B1 * 10/2024 Mazur ................... E05B 15/024
2007/0200370 A1 * 8/2007 Reithmeyer ............ E05B 63/18 292/340
2009/0173113 A1 * 7/2009 Pappas .................... E05C 3/041 70/83
2011/0074167 A1 * 3/2011 Taufman ............... E05B 17/007 292/336.3
2012/0104771 A1 * 5/2012 Johnson .............. E05B 63/0013 292/95
2013/0328330 A1 * 12/2013 McKenzie .......... E05B 65/0014 292/202
2015/0252589 A1 * 9/2015 Johnson .............. E05B 15/0205 292/340
2016/0348411 A1 * 12/2016 Liau ........................ E05C 3/041
2017/0030115 A1 * 2/2017 Fiedler ................ E05B 15/0205
2017/0058562 A1 * 3/2017 Bunch ................. E05B 17/2084
2017/0198501 A1 * 7/2017 Baker ................. E05B 65/0007
2017/0314305 A1 * 11/2017 Beversdorf ............. E05C 3/044
2018/0051478 A1 * 2/2018 Tagtow ............... E05B 15/0205
2020/0240176 A1 * 7/2020 Crosser ...................... E05B 7/00
2022/0112745 A1 * 4/2022 Stephenson ............. E05C 3/042
2022/0341230 A1 * 10/2022 Anderson ............... E05B 83/02
2023/0040016 A1 * 2/2023 Lajewardi ............... E05C 3/004
2023/0074741 A1 * 3/2023 Seykora .................... E05B 9/02

FOREIGN PATENT DOCUMENTS

GB 2246808 A * 2/1992 ............. E05B 65/06
WO WO-9844227 A1 * 10/1998 ............. E05B 53/00

* cited by examiner

LOCKING MECHANISM

CROSS-REFERENCE TO RELATED APPLICATIONS

This application claims priority and benefit from the U.S. Provisional Patent Application 63/368,307 filed Jul. 13, 2022, and titled, "LOCKING MECHANISM," which is incorporated herein by reference in its entirety for all purposes.

BACKGROUND

Securing boundaries around sections of land is important to landowners and those that occupy property for many reasons such as mitigating risk of theft or damage to property, animals, structure, etc. Oftentimes, the designated area of land or property is enclosed with a fence or wall. Inherently, people need access to the enclosed areas of property through a door or gate in a designated portion of the enclosure to move vehicles, equipment, animals, and the like into and out of the enclosed property. The door or gate is usually secured using a latch or locking mechanism of some kind. If the door or gate is unintentionally unsecured, the enclosed property is exposed, which could result in intruders having access to property secured in the enclosed area or animals being unintentionally released from the enclosed area or let into the enclosed area all of which cause problems for the property owner.

Many conventional locks for large properties have a locking arm that fits into a u-shaped channel. When ground heave or settling occurs, such as from ground freeze or earth movement, a post in one side of the side or the gate shifts vertically. When this shift happens, the locking arm often disengages from the u-shaped channel and causes the gate to unintentionally open, which leaves the enclosed property unsecured.

Therefore, improvements in the art could benefit from locking mechanisms for fences and enclosed areas that resist ground heave or ground movement challenges while maintaining a user friendly and easily accessible design.

BRIEF DESCRIPTION OF THE DRAWINGS

Non-limiting and non-exhaustive embodiments of the invention are described with reference to the following drawings. In the drawings, like reference numerals refer to like parts throughout the various figures, unless otherwise specified, wherein.

DETAILED DESCRIPTION

Figure 1A:
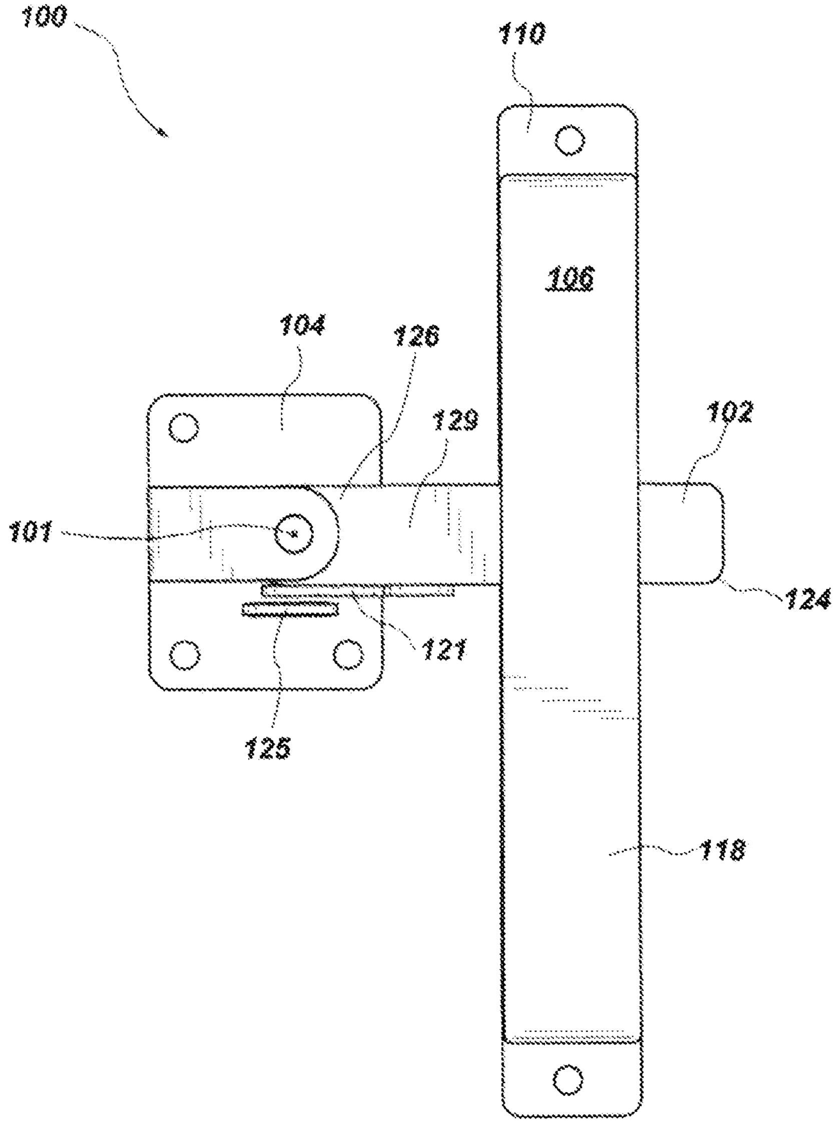
FIGS. 1A and 1B show a front plan and a perspective view, respectively, of an example locking mechanism according to the disclosure.

The subject matter of embodiments disclosed herein is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments will be described more fully hereinafter with reference to the accompanying drawings, which form a part hereof, and which show, by way of illustration, exemplary embodiments by which the systems and methods described herein may be practiced. The systems and methods may, however, be embodied in many different forms and should not be construed as limited to the embodiments set forth herein; rather, these embodiments are provided so that this disclosure will satisfy the statutory requirements and convey the scope of the subject matter to those skilled in the art.

The disclosed locking mechanisms help users avoid unlatching or post damage to fences on which the locking mechanisms are installed due to ground heaving and settling or other ground movement caused by freezing, earthquakes, natural settling, landslides, etc. A rotatable locking arm fits within an elongated, enclosed channel that can adjust when the fence post to which the locking arm is attached or to which the enclosed channel is attached moves vertically. The design differs from the conventional, shorter "U-shaped" channel that receives the locking arm. This U-shaped design has three sides with a top surface left unsecured or open to receive the rotatable locking arm. Such a conventional U-shaped design causes the locking arm to dislodge or radially rotate out of the U-shaped channel when certain ground heave or ground movement occurs, which can cause the gate to open leaving the enclosed space exposed and unsecured.

The disclosed locking mechanisms have an enclosed channel of a catch, which is about 12" tall in some examples, that allows for the locking arm to adjust vertically as needed when ground heave or ground movement occurs. In this example, the locking arm can move about 6" within the enclosed channel of the catch and needs 2" or more to clear the top surface of the channel. The channel into which the locking arm fits is a "catch" that receives the locking arm as it rotates into the interior space of the enclosed channel of the catch. When ground heave or settling occurs, one side or the other of the fence or the gate, respectively, move vertically relative to the other portion. This vertically shifts either the locking arm secured to the fence or the catch secured to the gate yet the locking arm remains within the channel of the catch. When this occurs, the disclosed locking mechanism remains secured even after withstanding the ground heave or movement. The rotatable locking arm and the catch can be any suitable height or length, as needed.

Alternatively, the locking arm could be secured to the gate and the catch secured to the fence, as desired. In all embodiments, the locking arm remains in the channel of the elongated, enclosed catch.

Additionally, some embodiments have a second lock option, which includes two holes—one in the rotatable locking arm and the other in the plate that is secured to the gate or the fence. When the locking arm is rotated into the locking position in which the arm is in the channel of the catch, the holes align. A user could place a post of a traditional padlock, a rigid fitting, or other locking mechanism through the two aligned holes to further secure the locking arm in place so it cannot rotate to an unlocked position even after one side or the other of the fence or gate experiences ground heave or movement.

Figure 1B:
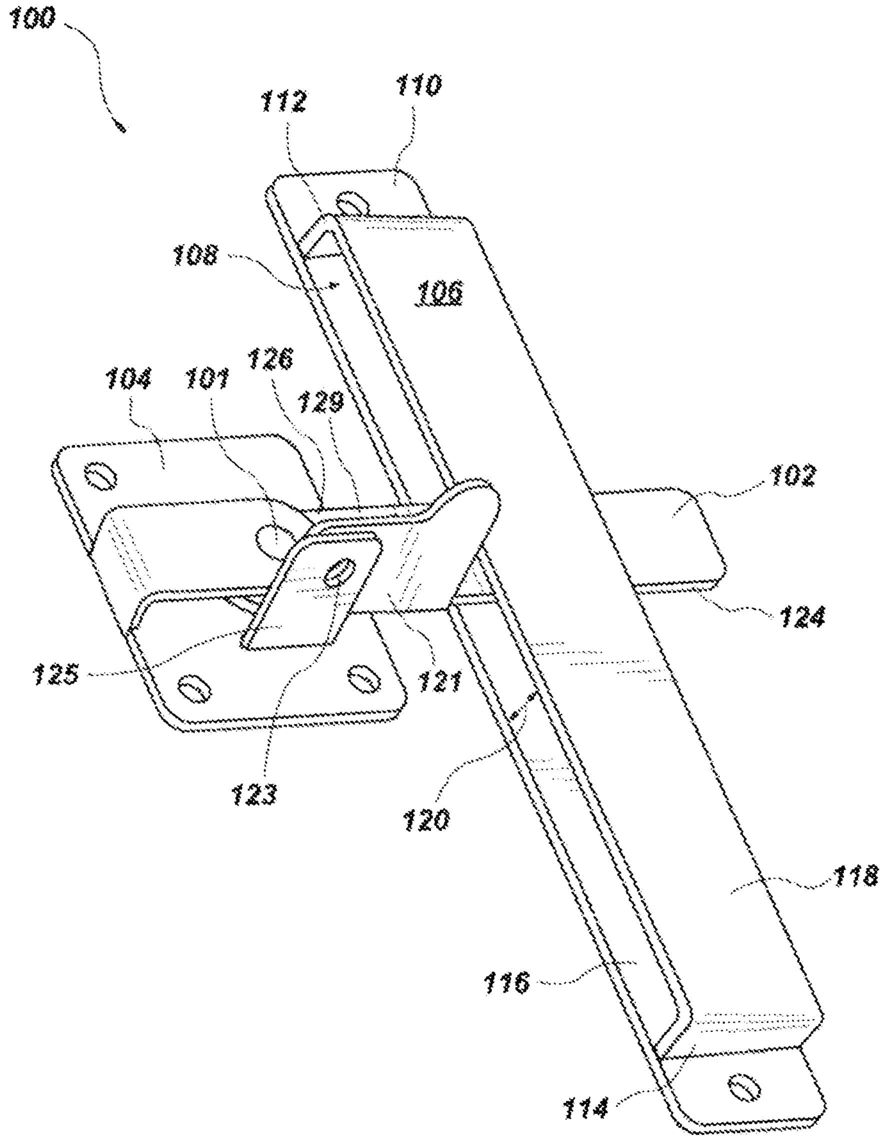
Figure 2:
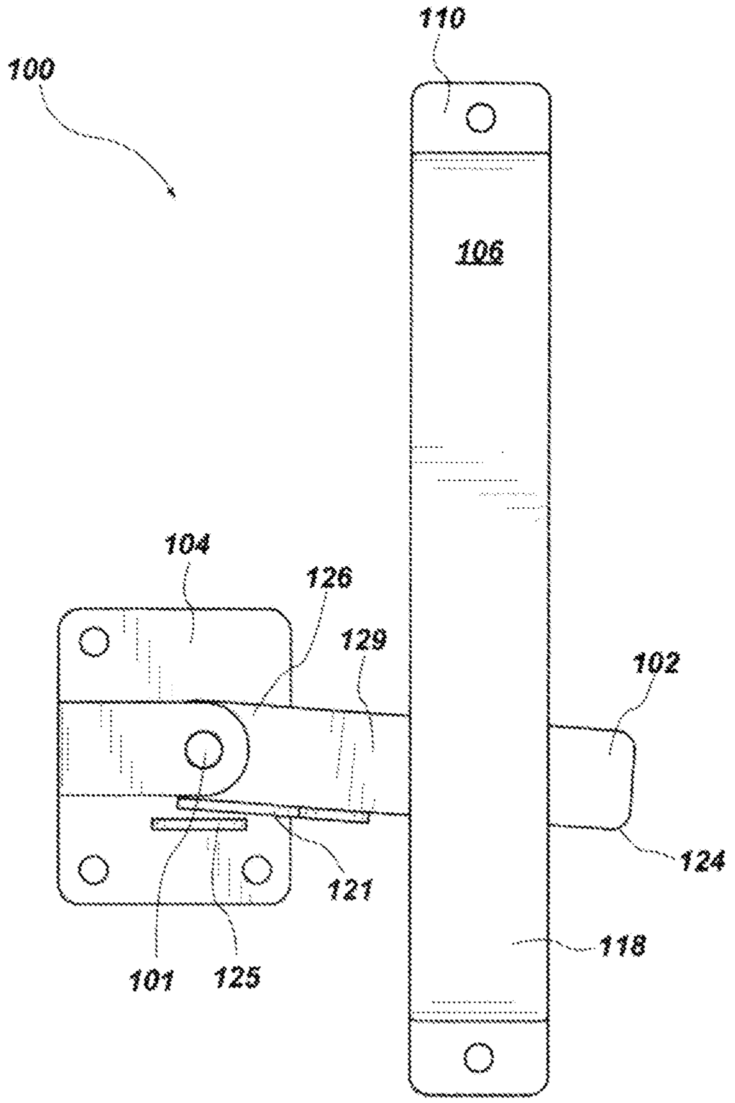
FIG. 2 shows a position of the locking mechanism shown in FIGS. 1A and 1B if one side of the locking mechanism shifts in a vertical direction.

FIGS. 1A-2 show an example locking mechanism 100 having a rotatable locking arm 102 attached to a locking arm attachment element 104. In this example, the rotatable locking arm 102 is molded to the locking arm attachment element 104 by a weld although in other examples any permanent or removeable method can be used to secure the elements together, such as molding, adhesives, bolts, and the like. The rotatable locking arm 102 rotates radially around an axis of rotation 101 in both a clockwise and counter-clockwise direction. The rotatable locking arm 102 is an elongated piece of metal having a length that allows it to rotate into and out of a catch 106 having an enclosed channel 108. In a locked position of the locking mechanism 100, the rotatable locking arm 102 is rotated clockwise into the enclosed channel 108 of the catch 106 so its distal end 124 extends beyond and is exposed beyond a distal side of the channel 108. A proximal end 124 of the rotatable locking arm 102 is attached to the axis of rotation 101 for the locking arm 102. The proximal end 124 of the rotatable locking arm 102 is attached to the axis of rotation 101 via a bolt or pin around which the rotatable locking arm 102 rotates.

The width of the enclosed channel 108 of the catch 106 is greater than the width of the rotatable locking arm 102 such that the locking arm 102 freely moves into and out of the channel 108. In the example shown in FIGS. 1A-2, the rotatable locking arm is a rectangular shape with rounded corners, but it could instead be another shape or contour including a cylindrical or cuboid shape or any other elongated shape having a width that is less than the width of the channel 108. Further, the channel 108 is shown as a generally rectangular shape in the catch and could alternatively be a different shape—whether a mating or different shape—than the elongated locking arm 102.

FIGS. 1A-2 show a catch attachment element 110 that is integrated into the catch 106 and secures the catch 106 to a static fence post, wall, or other fixed structure. Alternatively, the catch attachment element 110 is secured to the fence post, wall, or other fixed structure yet removeable from the remaining portions of the catch 106. In the example shown in FIGS. 1A-2, the catch attachment element 110 is integrated with or molded to the catch 106 to form four walls of the enclosed channel 108. In other examples, the catch 106 is a discrete element having four walls of its own. Referring back to the example shown in FIGS. 1A-2, the catch attachment element 110 forms a side wall 116 of the channel 108 while an opposing side wall 118 is spaced apart from the catch attachment element 110 side wall 116 a width 120 that fits the rotatable locking arm 102.

An upper catch wall 112 and a lower catch wall 114 extend between the opposing side walls 112, 114 of the enclosed channel 108. In the examples shown in FIGS. 1A-2, the upper catch wall 112 is integrated with the opposing side wall 118 of the channel 108. In other examples, the upper catch wall 112 could also be moveable around a hinge to allow it to be either locked in place in a closed position to create the upper catch wall 112 or unlocked to be rotated into an unlocked position to allow the rotatable arm to be remove if the ground heave or movement exceeded the available height to rotate the rotatable arm 102 out of the channel 108. In the examples shown in FIGS. 1A-2, the lower catch wall 114 is integrated into the catch 106 side wall 118 although, like the alternative of the upper catch wall 112, it could rotate from a locked to an unlocked position around a hinge in an alternative embodiment.

FIG. 2 shows the locking mechanism 100 in a position after the gate and fence to which the locking mechanism 100 is secured experienced ground heave or movement. Either or both of the portions of the ground into which the gate or fence is secured moved vertically (and possibly horizontally in another example). Typically, the locking arm attachment element 104 is attached to a gate (not shown) that rotates around a hinge(s) that are attached to a first fixed side of the fence. The catch 106 is attached to a second fixed side of the fence that is located on the opposite side of the gate from the first fixed side of the fence. When the ground heaves or moves, one side or the other of the fixed or second side of the fence shifts vertically (and/or in other directions), to cause the relative position of the rotatable locking arm to likewise shift within the enclosed channel 108 of the catch 106. FIG. 2 shows the locking mechanism 100 when one side or the other of the fence to which the catch 106 is attached shifts. In this shifting motion, the rotatable locking arm 102 changes position within the enclosed channel 108. In FIG. 2, the rotatable locking arm 102 is shifted to a lower position within the channel 108 by either ground heave on the fence side to which the catch 106 is attached or from ground settling or movement that causes the ground to move or otherwise cause the fence to sink down into the ground on the fence side to which the rotatable locking arm 102 is attached. This shift causes the rotatable locking arm 102 to rotate in a clockwise position as well, which is stopped by a locking arm stop 121. The locking arm stop 121 extends perpendicularly away from the locking arm attachment element 104 and prevents the rotatable locking arm 102 from rotating past an endpoint.

The locking arm stop 121 also has a locking arm stop hole 123. The locking element 125 extends perpendicularly from the rotatable locking arm 102 and has a locking arm hole element having a locking arm hole 122 that aligns with the locking arm stop hole 123 when the rotatable locking arm 102 is rotated into a locking position when it is in the channel 108. A padlock, hook, rigid locking element, or the like can be inserted through the aligned locking arm stop hole 123 and locking arm hole 122 to create even further security that the locking mechanism 100 will remain secured within the enclosed channel 108 of the catch 106 in the event of a ground heave or movement. In the examples shown in FIGS. 1A-5, the aligned locking arm hole 122 and the locking arm stop hole 123 are positioned on a proximal portion 126 of the rotatable locking arm 102. In alternative examples, such as the locking mechanism shown in FIG. 7B, the locking arm hole 122 can be located on the distal portion or a second locking arm hole 123 can be located on the distal portion of the locking arm 102. This distal portion 123 location allows for a padlock or other securable locking mechanism to be inserted through the locking arm hole 122 but does not require a second hole with which to align it either in the locking arm stop 121, the locking arm attachment element 104, or any other portion of the locking mechanism 100.

Figure 3:
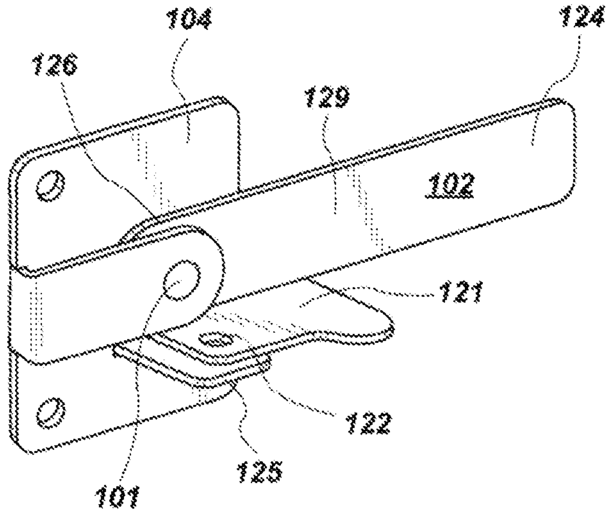
FIG. 3 is a front perspective view of the rotatable locking arm with the locking arm attachment element for the example locking mechanism shown in FIGS. 1A-2.
Figure 4:
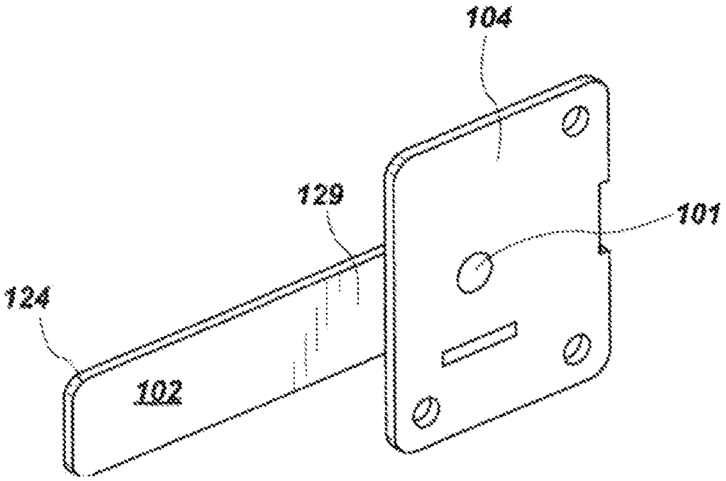
FIG. 4 is a back perspective view of the rotatable locking arm with the locking arm attachment element for the example locking mechanism shown in FIGS. 1A-2.
Figure 5:
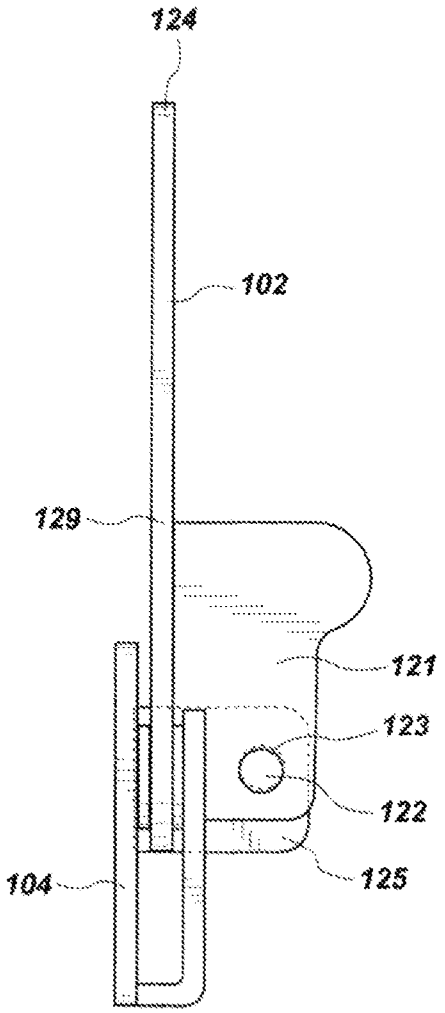
FIG. 5 is a top plan view of the rotatable locking arm with the locking arm attachment element for the example locking mechanism shown in FIGS. 1A-2.

FIGS. 3-5 show a front and back perspective view and a top plan view of the rotatable locking arm 102 and the locking arm attachment element 104 shown in FIGS. 1A-2 in a locked position without the catch 106. Here, the proximal portion 126 and some of a central portion 129 of the rotatable locking arm 102 is shown resting in the locked position in which the locking arm stop 121 rests upon the locking element 125. In this position, the locking arm stop hole 123 is aligned with the locking arm hole 122.

Figure 6:
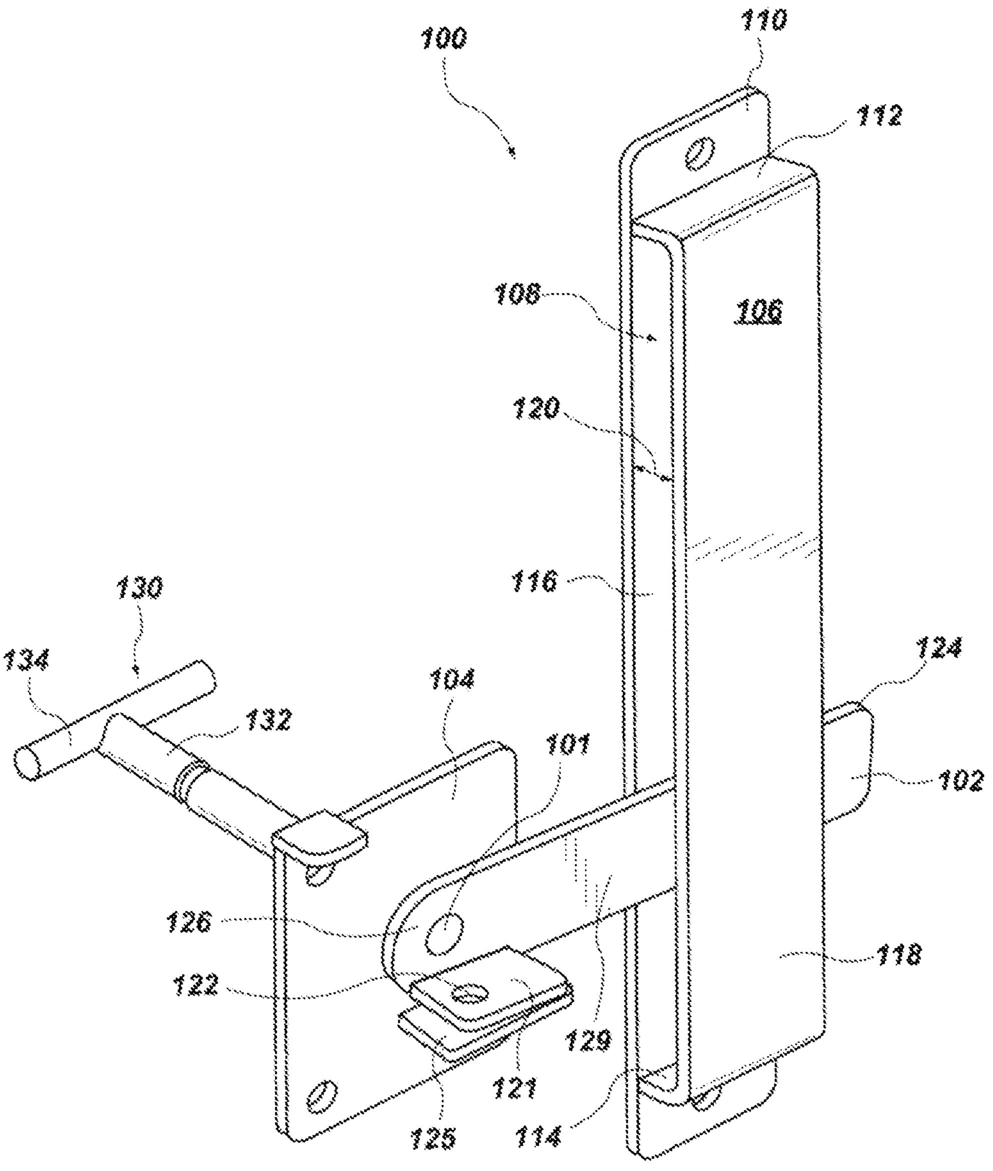
FIG. 6 is an alternative example of a locking mechanism according to aspect of this disclosure.

FIG. 6 shows another embodiment of the disclosed locking mechanism 100. This embodiment is similar to the embodiment shown in FIGS. 1A-5 with the addition of a handle 130 that is attached to and rotates the rotatable locking arm 102. In this example, the handle is a T-bar style with a post 132 and grip 134 that controls the axis of rotation 101 for the locking arm 102. A pin (not shown) secures the T-bar to the post 132 after the post 132 is inserted through the gate. The post 132 is attached to the axis of rotation 101 through a hole (not shown) in the locking arm attachment element 104. The post 132 extends through a cross-section of the gate perpendicularly away from a surface of the gate on an opposing side of the gate from where the locking arm attachment element 104 is attached to the gate. Because the post 132 extends away from the gate on the opposite side from where the locking arm attachment element 104 is attached, the gate is capable of being opened from a different side of the gate from the attachment point of the locking mechanism 100. Alternatively, whether the handle 130 is included or not, a user could use a stick, their hand, or other elongated element to lift the locking arm 102 in the space between the locking arm attachment element 104 and the catch attachment element 110. This space aligns with a space between the gate and the fence to which the catch is attached. In embodiments in which that space is somewhat narrow or simply as a convenience, the handle 130 helps users move the rotatable locking arm 102 from the locked to the unlocked position with ease.

Another example of an aid to move the rotatable locking arm from the locked to the unlocked position could be a cable or other flexible or semi-rigid securing element that can be secured to the rotatable locking arm. In this example with the cable, the cable is inserted through a secondary hole or holes in the rotatable locking arm stop—spaced apart from the rotatable locking arm hole—then threaded through holes above and below the rotatable locking arm attachment element on the gate to be connected together on the opposing side of the gate. This allows a user on the opposing side of the gate to control the rotation of the rotatable locking arm by pulling on the cable to which it is attached without the need to insert their hand into the space between the gate and the fence, which can be narrowed or non-existent due to the ground heave or movement or simply narrow by design.

Figure 7A:
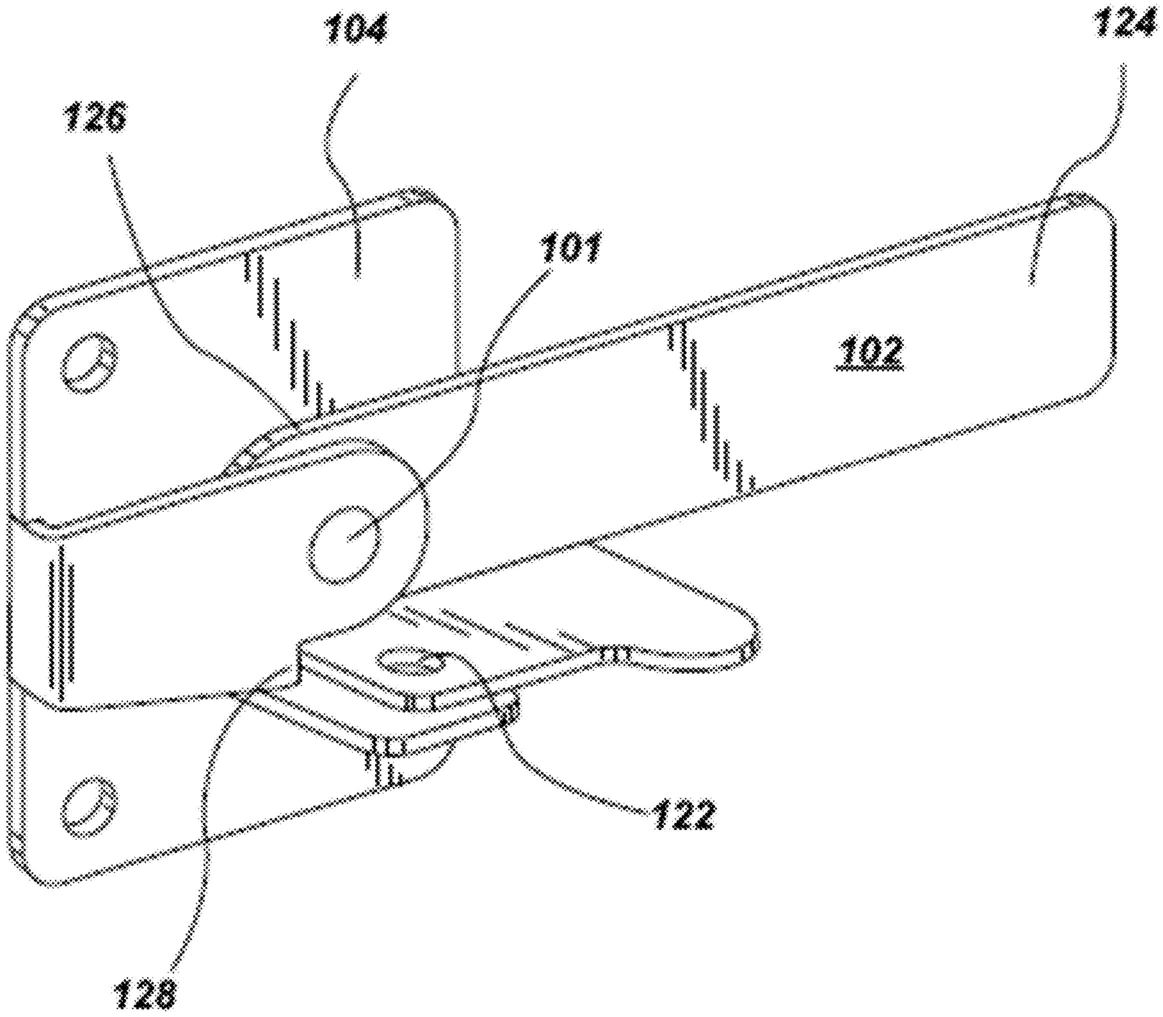
FIGS. 7A and 7B are still other alternative examples of a locking mechanism according to aspect of this disclosure.
Figure 7B:
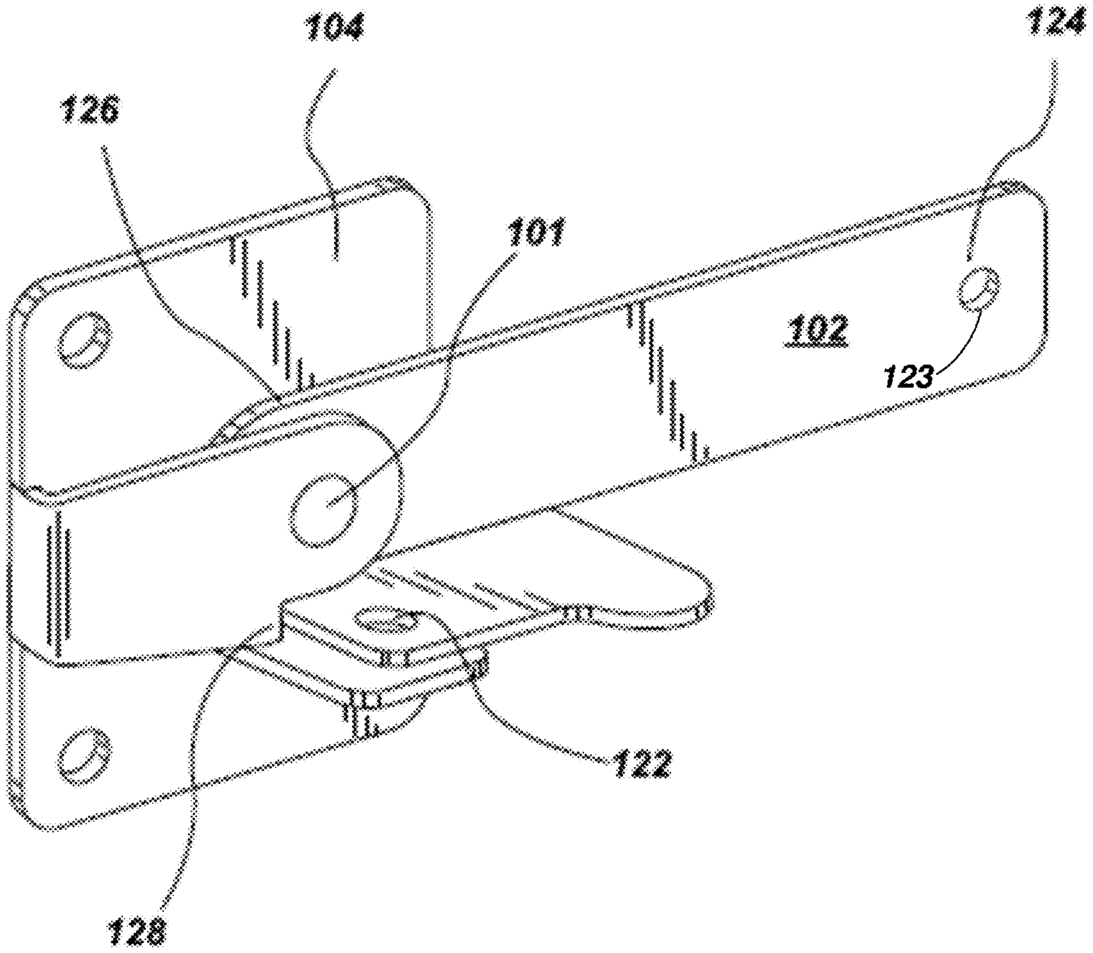

FIG. 7-7A shows another example locking mechanism 100 according to this disclosure that is similar to the embodiments shown in FIGS. 1-6 with the addition of a center axis rotation stop 128. The center of axis of rotation 101 around which the rotatable locking arm 102 radially rotates is secured by the center axis of rotation stop 128 during its rotation both clockwise and counterclockwise. The center axis of rotation stops 128 provides a mechanical stop to prevent the stop 128 from also rotating when the rotatable locking arm 102 radially rotates around the center axis of rotation 101, particularly during ground heave or other ground movement that also apply lateral and shear force to the center axis of rotation. In the example shown in FIG. 7A, the center axis of rotation stop 128 has a projection with the shoulder that abuts an edge of the locking arm hole element. In alternative embodiments, the center axis of rotation stop 128 can abut against any other stationary or rigid structure on the locking arm attachment element 104 or the locking arm 102.

Figure 8:
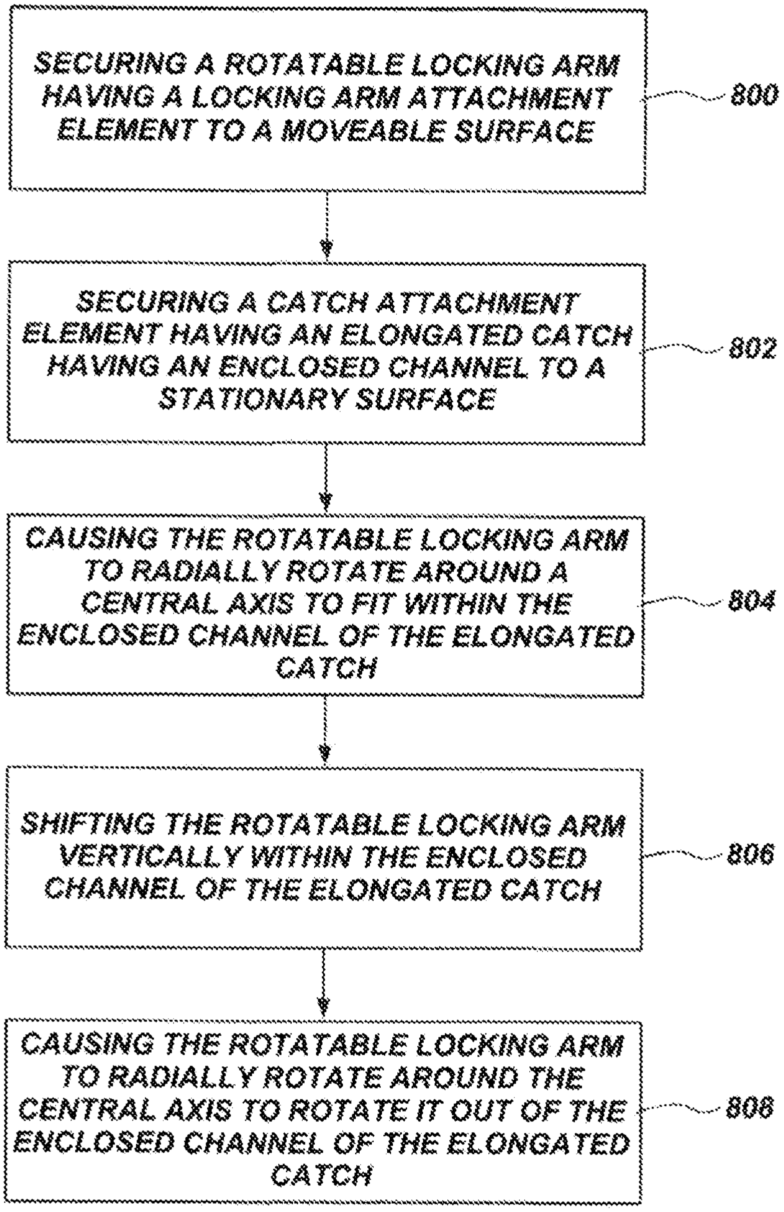
FIG. 8 is a sample method of installing and using an example locking mechanism according to this disclosure.

FIG. 8 shows a flowchart of an example method of installing and using the locking mechanisms disclosed herein. The rotatable locking arm attachment is secured to a moveable surface 800, such as a gate. As discussed above, the rotatable locking arm attachment could also be secured to a stationary surface, such as a fence post. A catch attachment element having an elongated catch with an enclosed channel is secured to a stationary surface 802, such as a fence post, wall, or other rigid, stationary surface. With this configuration, the rotatable locking arm can be caused to rotate radially around a central axis to fit within the enclosed channel of the elongated catch 804. Due to ground heave or ground movement of any kind, the rotatable locking arm can sometimes shift vertically (and/or horizontally or other directions), which causes the position of the moveable surface to shift vertically relative to the position of the stationary surface 806. Even after this ground heave or ground movement occurs, the rotatable locking arm remains in the enclosed channel of the elongated catch and can be caused to radially rotate around the central axis to rotate it out of the enclosed channel of the elongated catch 808. This arrangement allows the rotatable locking arm to be retained in the enclosed channel in a "locked" position even after the ground heave or ground movement occurs and still remain in a position in which it can be radially rotated out of the enclosed channel of the elongated catch to move to the "unlocked" position.

The subject matter of embodiments disclosed herein is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

What is claimed is:

1. A locking mechanism for securing a moveable gate to a fence, the moveable gate and the fence secured in ground as part of a fence system that encloses an area, the moveable gate secured to a first portion of ground and the fence secured to a second portion of ground adjacent to the first portion of ground, the locking mechanism comprising:

a rotatable locking arm attached to a locking arm attachment element secured to the moveable gate;

a catch having an enclosed channel and four walls surrounding the enclosed channel, the catch having a catch attachment element secured to the fence, wherein, when the rotatable locking arm is rotated to a first unlocked position, the rotatable locking arm is not fitted within the enclosed channel of the catch, and when the rotatable locking arm is rotated to a second locked position, the locking arm is fitted within the enclosed channel of the catch, and wherein when the rotatable locking arm is in the second locked position within the enclosed channel of the catch, the rotatable locking arm moves from an initial ground position to a heaved ground position when either or both of the first portion of ground and the second portion of ground heave vertically with respect to each other, and wherein the rotatable locking arm remains in the enclosed channel of the catch in both the initial ground position and the heaved ground position.

2. The locking mechanism of claim 1, wherein the rotatable locking arm has at least a 2" clearance of an upper wall of the four walls of the enclosed channel of the catch when rotating into the second locked position from the first unlocked position to be able to move from the initial ground position to the heaved ground position when either or both of the first portion of the ground and the second portion of the ground heave vertically with respect to each other.

3. The locking mechanism of claim 1, wherein the enclosed channel of the catch has a width that exceeds the width of the rotatable locking arm.

4. The locking mechanism of claim 2, wherein the enclosed channel of the catch is a single, integrated component.

5. The locking mechanism of claim 1, wherein the locking mechanism includes a second lock option that includes a rotatable locking arm hole positioned in the locking arm.

6. The locking mechanism of claim 5, wherein the rotatable locking arm hole is positioned on a distal portion of the rotatable locking arm, the distal portion of the rotatable locking arm positioned on a distal side of the catch when the locking arm is rotated to the second locked position.

7. The locking mechanism of claim 5, wherein the locking arm hole is positioned on a proximal portion of the rotatable locking arm, the proximal portion of the rotatable locking arm positioned on a proximal side of the catch when the locking arm is rotated to the second locked position.

8. The locking mechanism of claim 7, further comprising an attachment element hole positioned in the rotatable locking arm attachment element that aligns with the rotatable locking arm hole when the rotatable locking arm is in the second locked position.

9. The locking mechanism of claim 1, further comprising a handle attached to the rotatable locking arm.

10. The locking mechanism of claim 9, wherein the handle has a post that extends through the locking arm attachment element to position the handle and the rotatable locking arm on opposite sides of the locking arm attachment element.

11. The locking mechanism of claim 10, wherein the handle it a T-bar.

12. A locking mechanism for securing a moveable gate to a fence, the moveable gate and the fence secured in ground as part of a fence system that encloses an area, the moveable gate secured to a first portion of ground and the fence secured to a second portion of ground adjacent to the first portion of ground, the locking mechanism, comprising:

a rotatable locking arm having a locking arm width and a locking arm length;

a locking arm attachment element secured to the rotatable locking arm and secured to the moveable gate;

an elongated catch secured to the fence and having an enclosed channel with four walls, the elongated catch having a catch width and a catch length, the catch width exceeding the locking arm width and the catch length being at least 50% greater than the locking arm length;

wherein when the rotatable locking arm is positioned in a locked position within the enclosed channel of the catch, the rotatable locking arm moves from an initial ground position to a heaved ground position when either or both of the first portion of ground and the second portion of ground heave vertically with respect to each other, and wherein the rotatable locking arm remains in the enclosed channel of the catch in both the initial ground position and the heaved ground position.

13. The locking mechanism of claim 12, wherein the enclosed channel of the elongated catch is a single, integrated component.

14. The locking mechanism of claim 12, wherein the locking mechanism includes a second lock option that includes a locking arm hole positioned in the rotatable locking arm.

15. The locking mechanism of claim 12, further comprising a handle attached to the rotatable locking arm.

16. The locking mechanism of claim 15, wherein the handle has a post that extends through the locking arm attachment element to position the handle and the rotatable locking arm on opposite sides of the locking arm attachment element.

17. The locking mechanism of claim 15, wherein the handle is a T-bar.

18. The locking mechanism of claim 12, wherein the catch length is at least 100% greater than the locking arm length.

* * * * *